(12) United States Patent (10) Patent No.: US 12,501,542 B2
Kim (45) Date of Patent: Dec. 16, 2025

(54) SUBSTRATE WITH IDENTIFICATION CODES COMPOSED OF IDENTIFICATION PADS

(71) Applicant: Samsung Electronics Co., Ltd., Suwon-si (KR)

(72) Inventor: Sun Jun Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 244 days.

(21) Appl. No.: 18/298,667

(22) Filed: Apr. 11, 2023

(65) Prior Publication Data

US 2024/0032188 A1 Jan. 25, 2024

(30) Foreign Application Priority Data

Jul. 19, 2022 (KR) ........................ 10-2022-0088978

(51) Int. Cl.
*H05K 1/02* (2006.01)
*H05K 1/14* (2006.01)

(52) U.S. Cl.
CPC ........... *H05K 1/0269* (2013.01); *H05K 1/142* (2013.01); *H05K 2201/099* (2013.01)

(58) Field of Classification Search
CPC .................. H05K 1/0269; H05K 1/142; H05K 2201/099; H05K 2201/09781; H05K 2201/09918; H05K 2203/163; H05K 1/0266; H05K 1/111

See application file for complete search history.

(56) References Cited

U.S. PATENT DOCUMENTS

| | | | | |
|---|---|---|---|---|
| 2,760,404 A | * | 8/1956 | King .................... | G06K 1/126 346/33 A |
| 3,621,116 A | * | 11/1971 | Adams ................ | H05K 1/0287 439/55 |
| 4,263,504 A | * | 4/1981 | Thomas ........... | G06K 19/06037 235/487 |
| 4,609,208 A | * | 9/1986 | Wrobel ................ | H01B 7/368 283/81 |
| 4,659,938 A | * | 4/1987 | Aoyama ............. | H05K 3/0008 250/226 |

(Continued)

FOREIGN PATENT DOCUMENTS

| | | |
|---|---|---|
| JP | H 05-218600 A | 8/1993 |
| JP | 2003-317941 A | 11/2003 |

(Continued)

*Primary Examiner* — Timothy J. Dole
*Assistant Examiner* — Muhammed Azam
(74) *Attorney, Agent, or Firm* — Harness, Dickey & Pierce, P.L.C.

(57) ABSTRACT

A substrate may include a base substrate and first to fourth identification codes on the base substrate, wherein the substrate is one of a plurality of substrates at a row 'c' and a column 'd' in a (b)th strip of an (a)th panel, where 'a', 'b', 'c' and 'd' are natural numbers, and the plurality of substrates are included in the (b)th strip of the (a)th panel, and wherein the first identification code includes information on the 'a', the second identification code includes information on the 'b', the third identification code includes information on the 'c', and the fourth identification code includes information on the 'd'.

18 Claims, 18 Drawing Sheets

(56) References Cited

U.S. PATENT DOCUMENTS

| | | | | |
|---|---|---|---|---|
| 4,924,078 | A * | 5/1990 | Sant'Anselmo | ............................ G06K 19/06037 283/117 |
| 4,939,354 | A * | 7/1990 | Priddy | .................... G06K 7/14 235/494 |
| 5,051,870 | A * | 9/1991 | Companion | ......... H01R 13/465 361/767 |
| 5,093,183 | A * | 3/1992 | Strunka | ................ H05K 1/0266 428/209 |
| 5,204,515 | A * | 4/1993 | Yoshida | ........... G06K 19/06037 235/494 |
| 5,266,380 | A * | 11/1993 | Renguso | .............. H05K 3/4638 428/209 |
| 5,288,986 | A * | 2/1994 | Pine | ................. G06K 19/06037 235/487 |
| 5,386,309 | A * | 1/1995 | Nam | .................... G02F 1/13452 349/149 |
| 5,445,271 | A * | 8/1995 | Kakizaki | ........... H01L 21/67366 |
| 5,691,527 | A * | 11/1997 | Hara | ..................... G06K 7/1456 235/494 |
| 5,726,435 | A * | 3/1998 | Hara | .................... G06K 7/1417 235/494 |
| 5,768,107 | A * | 6/1998 | Ouchi | ................... H05K 1/0269 361/792 |
| 5,825,015 | A * | 10/1998 | Chan | ................ G06K 19/06037 235/494 |
| 6,114,634 | A * | 9/2000 | Dittmer | ................ H05K 3/4638 174/250 |
| 6,115,513 | A * | 9/2000 | Miyazaki | ............... G06F 3/0426 382/181 |
| 6,168,971 | B1 * | 1/2001 | Love | ...................... H05K 3/303 438/106 |
| 6,268,616 | B1 * | 7/2001 | Kamekawa | ........... H01L 23/544 257/E23.179 |
| 6,496,884 | B1 * | 12/2002 | Friesen | .................... G06F 1/181 710/100 |
| 6,512,180 | B2 * | 1/2003 | Nakagawa | ........... H01L 23/544 174/250 |
| 6,567,542 | B1 * | 5/2003 | Koljonen | .............. G06T 7/0006 382/147 |
| 7,020,322 | B2 * | 3/2006 | Nakano | ................ H05K 1/0269 257/E23.179 |
| 7,129,146 | B2 * | 10/2006 | Hsu | ......................... H01L 24/81 257/E23.179 |
| 7,199,478 | B2 * | 4/2007 | Jung | ................. H01L 23/49838 361/767 |
| 7,236,624 | B2 * | 6/2007 | Ohazama | ............... G01R 31/68 349/150 |
| 7,371,071 | B2 * | 5/2008 | Cho | ..................... H05K 3/0097 439/885 |
| 7,371,107 | B2 * | 5/2008 | Deng | ................... H01R 12/716 439/491 |
| 7,642,662 | B2 * | 1/2010 | Kasuga | ................. H01L 23/544 257/797 |
| 7,676,038 | B2 * | 3/2010 | Simske | ............ G06K 19/06037 380/55 |
| 7,980,890 | B2 * | 7/2011 | Gibson | ..................... G09F 3/10 283/81 |
| 8,431,827 | B2 * | 4/2013 | Nishikawa | ........... H05K 1/0266 438/57 |
| 8,575,495 | B2 * | 11/2013 | Muramatsu | .......... H05K 1/0269 174/260 |
| 9,253,877 | B2 * | 2/2016 | Sato | ..................... H05K 1/0269 |
| 10,470,300 | B1 * | 11/2019 | Seki | ..................... H05K 1/0269 |
| 11,026,322 | B2 * | 6/2021 | Blake, III | .............. H05K 1/141 |
| 11,516,914 | B2 * | 11/2022 | Choi | ........................ H05K 1/11 |
| 2003/0227593 | A1 * | 12/2003 | Miki | ....................... H01L 23/544 349/151 |
| 2004/0036833 | A1 * | 2/2004 | Monzen | ................. H05K 3/361 349/158 |
| 2007/0247508 | A1 * | 10/2007 | Miura | ...................... B41J 3/407 347/102 |
| 2008/0121413 | A1 * | 5/2008 | Cardona | .............. H05K 1/0269 174/250 |
| 2008/0241999 | A1 * | 10/2008 | Sato | ...................... H01L 23/544 257/E23.179 |
| 2009/0126979 | A1 * | 5/2009 | Chae | .................... H05K 1/0269 29/829 |
| 2009/0223435 | A1 * | 9/2009 | Fan | ...................... H05K 1/0266 116/240 |
| 2013/0126215 | A1 * | 5/2013 | Cho | ..................... H05K 1/0209 29/852 |
| 2014/0028336 | A1 * | 1/2014 | Lee | .................... G01R 31/2843 324/750.3 |
| 2014/0160754 | A1 * | 6/2014 | Lee | ........................... F21V 5/04 362/249.02 |
| 2018/0005956 | A1 * | 1/2018 | Degraeve | .............. H01L 23/562 |
| 2018/0312432 | A1 * | 11/2018 | Horiuchi | .......... H05K 3/0029 |
| 2021/0356802 | A1 * | 11/2021 | Liao | .................. G02F 1/133302 |
| 2021/0382967 | A1 * | 12/2021 | Goergen | ............... H04L 9/3263 |
| 2023/0180381 | A1 * | 6/2023 | Lee | ...................... H05K 1/0269 257/797 |
| 2023/0292106 | A1 * | 9/2023 | Ito | ........................ H04W 24/02 |
| 2024/0032188 | A1 * | 1/2024 | Kim | .................... H05K 1/0269 |

FOREIGN PATENT DOCUMENTS

| | | |
|---|---|---|
| JP | 2019-129183 A | 8/2019 |
| KR | 101408848 B1 | 6/2014 |

* cited by examiner

SUBSTRATE WITH IDENTIFICATION CODES COMPOSED OF IDENTIFICATION PADS

CROSS-REFERENCE TO RELATED APPLICATION

This application claims priority from Korean Patent Application No. 10-2022-0088978 filed on Jul. 19, 2022 in the Korean Intellectual Property Office, and all the benefits accruing therefrom under 35 U.S.C. 119, the contents of which in its entirety are herein incorporated by reference.

BACKGROUND

Technical Field

The present disclosure relates to substrates.

Description of the Related Art

As electronic components are highly functionalized, multi-functionalized, and diversified, purpose of uses required for a substrate are also diversified. The substrate refers to a plate in which an electric circuit is formed, and its main example is a printed circuit board (PCB) that is a synthetic resin plate wired with copper on a surface and equipped with electrical components such as integrated circuits or resistors.

The printed circuit board may include various codes or marks to produce and manage individual products by identifying information on the individual products during a manufacturing process.

SUMMARY

Some example embodiments of the present disclosure provide substrates capable of tracking a row and a column of a strip of a panel from which the substrate is separated.

Example embodiments of the present disclosure are not limited to those mentioned above, and some example embodiments of the present disclosure, which are not mentioned herein, will be clearly understood by those skilled in the art from the following description of the present disclosure.

According to an aspect of the present disclosure, a substrate includes a base substrate and first to fourth identification codes on the base substrate, wherein the substrate is a substrate, which is in a row 'c' and a column 'd' in a (b)th strip of an (a)th panel, where 'a', 'b', 'c' and 'd' are a natural numbers, the plurality of substrates being included in the (b)th strip of the (a)th panel, the first identification code includes information on the 'a', the second identification code includes information on the 'b', the third identification code includes information on the 'c', and the fourth identification code includes information on the 'd'.

According to another aspect of the present disclosure, a substrate includes a base substrate including a first surface and a second surface opposite to the first surface, and a first identification code and a second identification code both on the first surface of the base substrate, wherein the substrate is one of a plurality of substrates, the plurality of substrates being included in a strip of a panel, each of the first and second identification codes includes at least one identification pad, the first identification code includes information on a position of the strip on the panel, and the second identification code includes information on a position of the substrate on the strip.

According to another aspect of the present disclosure, a substrate includes a base substrate including a first surface and a second surface opposite to the first surface, a connection pad on the first surface of the base substrate, the connection pad including a connection terminal disposed thereon, and first to fourth identification codes on the first surface of the base substrate, wherein the substrate is one of a plurality of substrates at a row 'c' and a column 'd' in a (b)th strip of an (a)th panel, where 'a', 'b', 'c' and 'd' are natural numbers, the plurality of substrates being included in the (b)th strip of the (a)th panel, the first identification code includes information on the 'a', the second identification code includes information on the 'b', the third identification code includes information on the 'c', the fourth identification code includes information on the 'd', and each of the first to fourth identification codes includes at least one identification pad, which has a width smaller than that of the connection pad, and the connection terminal is not on the at least one identification pad.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

While the term "same," "equal" or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Figure 1:
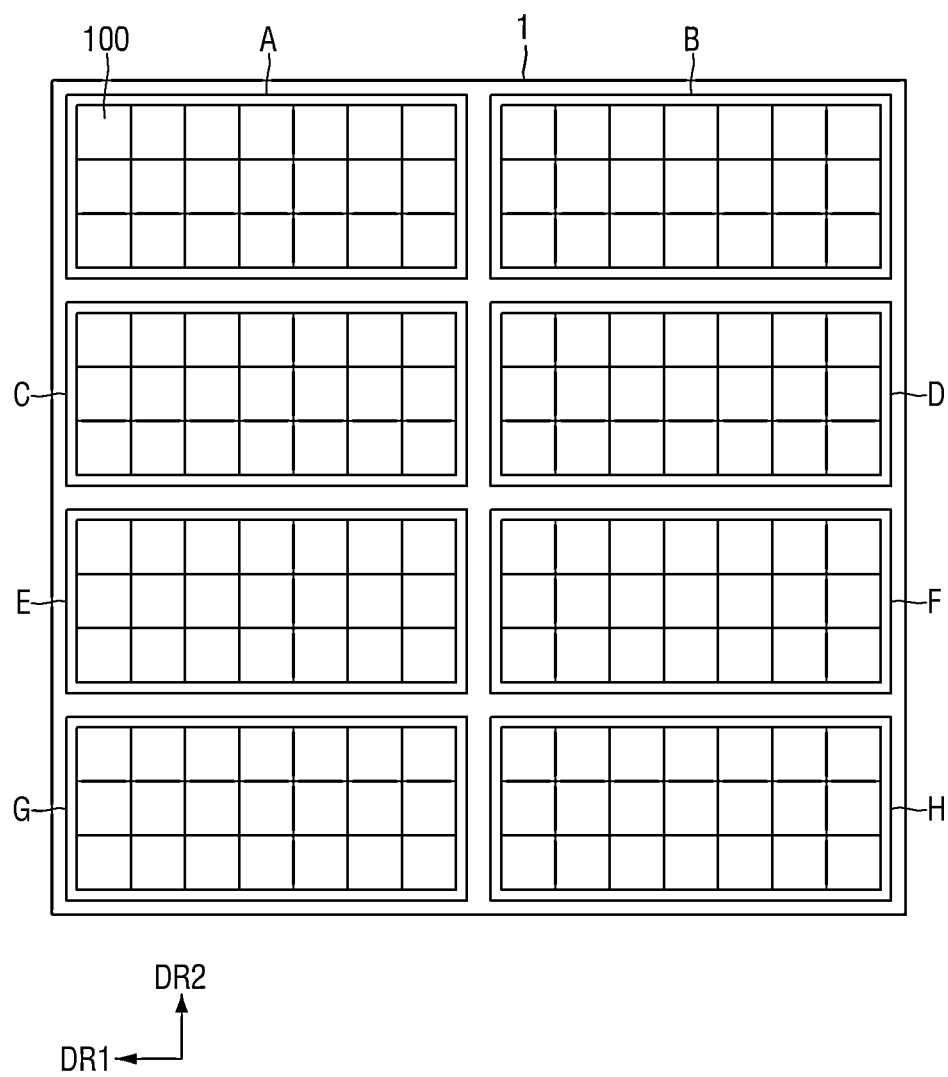
FIG. 1 is a view illustrating a panel according to an example embodiment.
Figure 2:
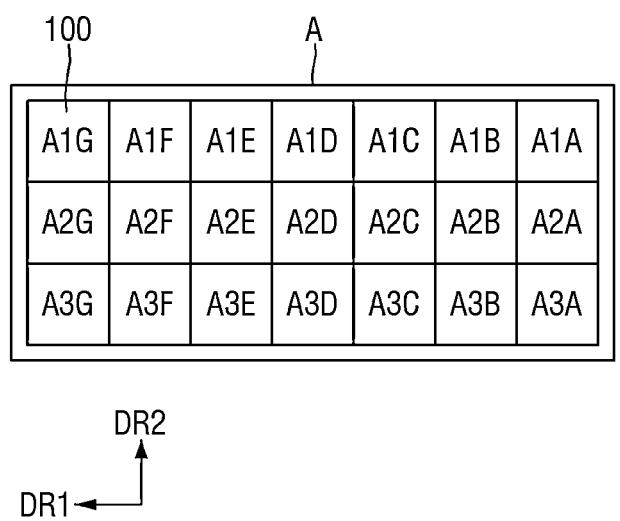
FIG. 2 is a view illustrating a strip according to an example embodiment.

FIG. 1 is a view illustrating a panel according to an example embodiment. FIG. 2 is a view illustrating a strip according to an example embodiment.

Referring to FIGS. 1 and 2, a panel 1 according to an example embodiment may include a plurality of strips A to H. The plurality of strips A to H may be arranged along a first direction DR1 and a second direction DR2. The plurality of strips A to H may be defined by a scribe line. The plurality of strips A to H may be formed by cutting the panel 1 along the scribe line.

In this case, the first direction DR1 may be in a row direction, and the second direction DR2 may be a column direction.

Each of the strips A to H may include a plurality of substrates 100. The plurality of substrates 100 may be arranged along the first direction DR1 and the second direction DR2. For example, the strip A may include a plurality of substrates 100 arranged in three rows and seven columns. The strip A may include substrates A1A, A1B, A1C, A1D, A1E, A1F and A1G disposed in columns A to G of a first row, substrates A2A, A2B, A2C, A2D, A2E, A2F and A2G disposed in columns A to G of a second row, and substrates A3A, A3B, A3C, A3D, A3E, A3F and A3G disposed in columns A to G of a third row.

The plurality of substrates 100 may be defined by a scribe line. The plurality of substrates 100 may be formed by cutting each of the strips A to H along the scribe line. The substrate 100 may be referred to as a unit.

The substrate 100 may be a printed circuit board (PCB).

Figure 3:
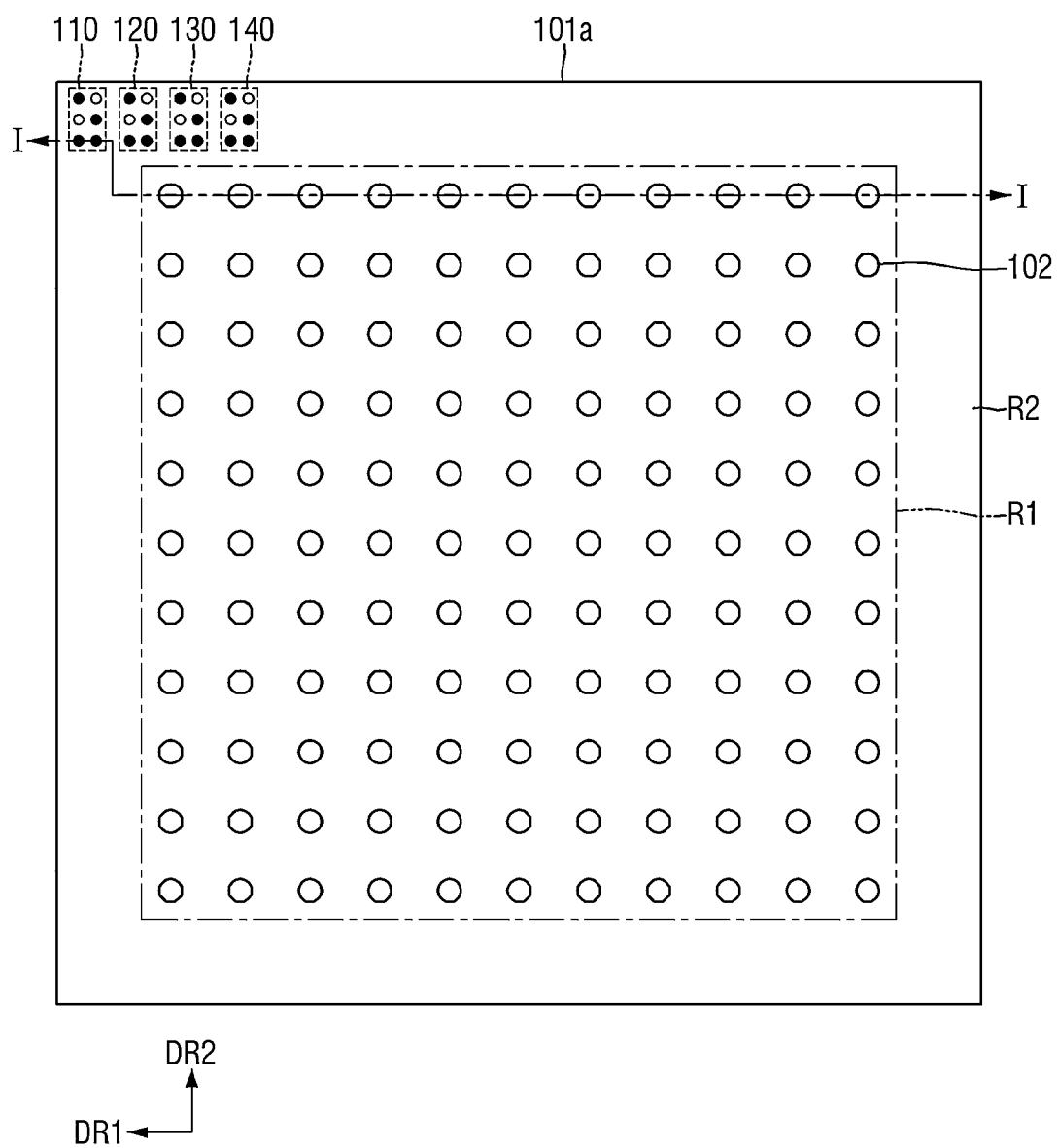
FIG. 3 is a view illustrating a substrate according to an example embodiment.
Figure 4:
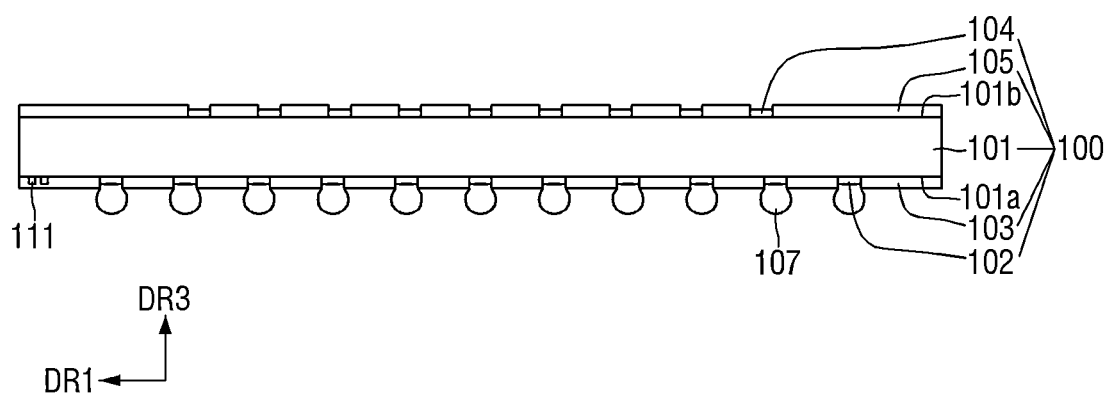
FIG. 4 is a cross-sectional view taken along line I-I of FIG. 3.

FIG. 3 is a view illustrating a substrate according to an example embodiment. FIG. 4 is a cross-sectional view taken along line I-I of FIG. 3.

Referring to FIGS. 3 and 4, the substrate 100 according to an example embodiment may include a base substrate 101, a first connection pad 102, a first solder resist layer 103, a second connection pad 104, a second solder resist layer 105, and identification codes 110, 120, 130 and 140.

The base substrate 101 may include a first surface 101a and a second surface 101b, which are opposite to each other. The first surface 101a and the second surface 101b may be opposite to each other in a third direction DR3 crossing the first direction DR1 and the second direction DR2.

The base substrate 101 may include, for example, at least one material selected from a phenol resin, an epoxy resin, or a polyimide.

The first connection pad 102 may be disposed on the first surface 101a of the base substrate 101. The first solder resist layer 103 may be disposed on the first surface 101a of the base substrate 101. The first solder resist layer 103 may expose at least a portion of the first connection pad 102. The first solder resist layer 103 may expose at least a portion of a lower surface of the first connection pad 102.

A first connection terminal 107 may be disposed on the first connection pad 102. The first connection terminal 107 may be electrically connected to the first connection pad 102.

The second connection pad 104 may be disposed on the second surface 101b of the base substrate 101. The second solder resist layer 105 may be disposed on the second surface 101b of the base substrate 101. The second solder resist layer 105 may expose at least a portion of the second connection pad 104. The second solder resist layer 105 may expose at least a portion of an upper surface of the second connection pad 104. The second connection pad 104 may be electrically connected to the first connection pad 102 by internal lines of the base substrate 101.

Each of the first connection pad 102 and the second connection pad 104 may be made of a metal such as copper (Cu), aluminum (Al), nickel (Ni), iron (Fe), tungsten (W), silver (Ag), or gold (Au), or an alloy thereof.

The first surface 101a of the base substrate 101 may include a first region R1 and a second region R2.

The first region R1 may include a first connection pad 102 and a plurality of circuit patterns connected to the first connection pad 102. A first connection terminal 107 may be disposed on the first connection pad 102. The first connection terminal 107 may be electrically connected to an external device.

The second region R2 may be a region where the first connection pad 102 and the plurality of circuit patterns are not formed. That is, the second region R2 may be defined as the remaining region of the first surface 101a of the base substrate 101 except for the first region R1. The second region R2 may include identification codes 110, 120, 130 and 140.

The identification codes 110, 120, 130 and 140 may be disposed in the remaining region of the first surface 101a of the base substrate 101, and may be disposed in a region that does not affect the first connection pad 102 and the plurality of circuit patterns. Each of the first to fourth identification codes 110, 120, 130 and 140 may be disposed at various positions inside the second region R2.

A boundary line of the first region R1 is illustrated as constituting a square, but is not limited thereto, and it is understood that the boundary line of the first region R1 may have various shapes depending on designs.

In some example embodiments, the identification codes 110, 120, 130 and 140 may be adjacent to one another. For example, the first to fourth identification codes 110, 120, 130 and 140 may be sequentially disposed in the opposite direction of the second direction DR2, but the present disclosure is not limited thereto. Various modifications may be made in the order of the first to fourth identification codes 110, 120, 130 and 140. For example, the first identification code 110, the third identification code 130, the second identification code 120 and the fourth identification code 140 may be disposed in the second direction DR2.

In some example embodiments, the identification code 110, 120, 130 and 140 may be adjacent to a vertex where a side of the first surface 101a, which is extended in the first direction DR1, and a side of the first surface 101a, which is extended in the second direction DR2, meet.

The identification codes 110, 120, 130 and 140 may be disposed on the first surface 101a of the base substrate 101. The identification codes 110, 120, 130 and 140 each may include a plurality of identification pads 111. The identification pads 111 may be disposed on the first surface 101a of the base substrate 101.

The identification pad 111 is not electrically connected to the second connection pad 104 by the internal lines of the base substrate 101. That is, the identification pad 111 may be a dummy pad.

The identification pad 111 may include, for example, the same material as that of the first connection pad 102. The identification pad 111 may be formed through a lithography process or the like.

For example, a thickness of the identification pad 111 in the third direction DR3 may be the same as or substantially similar to that of the first connection pad 102. For example, a width of the identification pad 111 in the first direction DR1 or the second direction DR2 may be smaller than that of the first connection pad 102.

For example, the identification pad 111 may include the same material as that of the first connection pad 102.

In some example embodiments, the first solder resist layer 103 may cover the identification pad 111. The identification pad 111 may not be exposed by the first solder resist layer 103.

The identification code 110, 120, 130 and 140 may include information on the substrate 100. The identification codes 110, 120, 130 and 140 may be represented using the identification pad 111, which is not a number or a character (e.g., alphabet). The identification codes 110, 120, 130 and 140 may represent the information on the substrate 100 depending on whether a plurality of identification pads 111 are disposed, a position in which the plurality of identification pads 111 are disposed, or a shape of the plurality of identification pads 111.

The identification codes 110, 120, 130 and 140 may include information on panel, strip, row and column, from which the substrate 100 is separated. The first identification code 110 may include information on a position of a panel in a lot, the second identification code 120 may include information on a strip on the panel, and the third identification code 130 and the fourth identification code 140 may include information on the position of the substrate 100 on the strip.

When the substrate 100 is a substrate disposed in row 'c' and column 'd' ('c' and 'd' are natural numbers) in a (b)th strip (b is a natural number) among a plurality of substrates formed by cutting the (b)th strip of an (a)th panel ('a' is a natural number), the first identification code 110 may include information on 'a', the second identification code 120 may include information on 'b', the third identification code 130 may include information on 'c', and the fourth identification code 140 may include information on 'd'. The first identification code 110 may represent 'a', the second identification code 120 may represent 'b', the third identification code 130 may represent 'c', and the fourth identification code 140 may represent 'd'. 'a' may mean a corresponding panel among a plurality of panels included in a lot.

For example, referring to FIGS. 1 and 2, a substrate A2G disposed in a second row and a column G in a strip 'A' of a panel 1 may include a first identification code 110 representing 1, a second identification code 120 representing A, a third identification code 130 representing 2, and a fourth identification code 140 representing G.

For example, a width of a region, in which the respective identification codes 110, 120, 130 and 140 are disposed, in the first direction DR1 may be 100 μm or less, and a width of the region in the second direction DR2 may be 200 μm.

For example, the substrate 100 may be generated by cutting a panel into a plurality of units after a process is performed in a unit of panel. Therefore, when the process is performed, the same defect may be generated in the plurality of panels by the order in which the panels are inserted, a proceeding direction in which the process is performed, and the like. When information on the panel and information on the strip are formed on an outer portion of the strip, and information on row and column in the strip is formed on one surface of the substrate, information on the panel and information on the strip cannot be identified after the panel is singulated into a plurality of units. The information on the panel, strip, row and column may be values indicating which panel, strip, row and column, respectively.

However, because the substrate 100 according to some example embodiments includes the identification codes 110, 120, 130 and 140, it is possible to identify a corresponding row and column of a corresponding strip of a corresponding panel from which the substrate 100 is separated. That is, even after the singulation process of the substrate 100 is performed, it is possible to track a corresponding row and column of a corresponding strip of a corresponding panel from which the substrate 100 is separated. Therefore, when a defect is detected on the substrate 100, it is possible to more easily identify a panel, strip, row or column from which the defect has been detected, through the identification codes 110, 120, 130 and 140. That is, defect information and information on the panel, strip, row and column of the substrate 100 may be mapped.

In addition, the identification codes 110, 120, 130 and 140 of the substrate 100 according to some example embodiments are not represented by characters, numbers, and the like, and may be represented using the identification pad 111. Therefore, an area occupied by the identification codes 110, 120, 130 and 140 on the substrate 100 may be reduced. Thus, the substrate 100 may further include an additional identification code that includes information other than the first to fourth identification codes 110, 120, 130 and 140.

Also, the identification codes 110, 120, 130 and 140 of the substrate 100 according to some example embodiments may be disposed on one surface of the base substrate 101. Therefore, only one surface of the base substrate 101 may be checked to identify information on the substrate 100. The identification codes 110, 120, 130 and 140 may be identified using, for example, a microscope or an X-ray.

FIGS. 5 to 8 are views illustrating identification codes according to some example embodiments.

Hereinafter, the description will be based on the first identification code 110. The description of the first identification code 110 may be applied to the second to fourth identification codes 120, 130 and 140.

Figure 5:
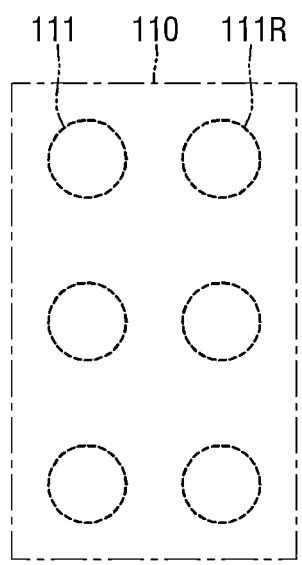
FIGS. 5 to 8 are views illustrating an identification code according to some example embodiments.
Figure 6:
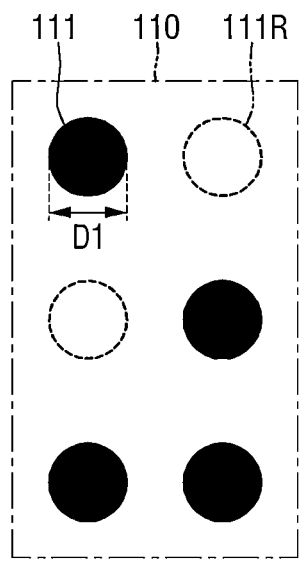
Figure 7:
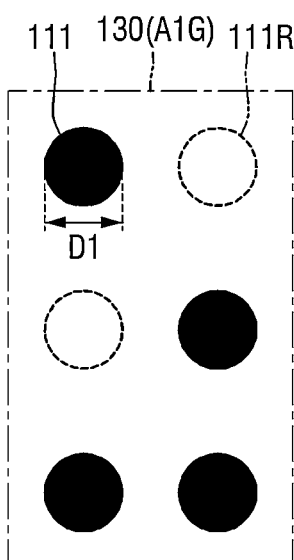
Figure 8:
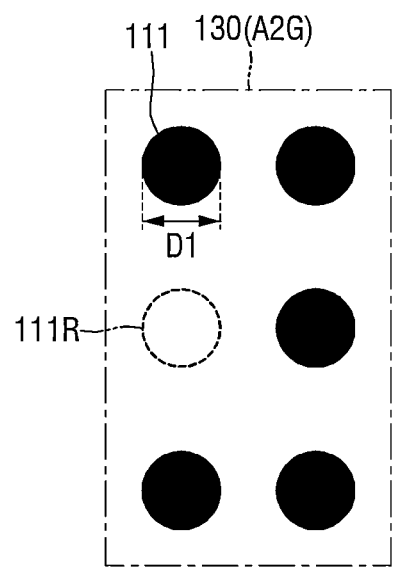

Referring to FIGS. 5 and 6, the first identification code 110 may include a plurality of unit regions 111R in which the identification pad 111 may be formed. In some example embodiments, the first identification code 110 may include six unit regions 111R. The six unit regions 111R may be arranged in three rows and two columns, for example. The number, arrangement, etc. of the plurality of unit regions 111R included in the first identification code 110 are not limited to those shown, and may vary depending on designs.

The second to fourth identification codes 120, 130 and 140 may have the same structure as that of the first identification code 110. That is, the second to fourth identification codes 120, 130 and 140 each may include a plurality of unit regions 111R.

The first identification code 110 may represent from which panel the substrate 100 is separated by using whether the identification pad 111 is formed in each unit region 111R. The first identification code 110 may represent from which panel the substrate 100 is separated depending on which position of the unit area 111R, among the plurality of unit areas 111R, the identification pad 111 is formed.

Using whether the identification pad 111 is formed in each unit region 111R, the second identification code 120 may represent from which strip in the panel the substrate 100 is separated, the third identification code 130 may represent from which row in the strip the substrate 100 is separated, and the fourth identification code 140 may represent from which column in the strip the substrate 100 is separated.

For example, referring to FIGS. 1, 2, 7 and 8, the first, second and fourth identification codes disposed on the substrate A1G disposed in the first row and (G)th column in the strip A of the panel 1 may be the same as the first, second and fourth identification codes disposed on the substrate A2G disposed in the second row and (G)th column in the strip A of the panel 1, respectively. This is because the substrate A1G and the substrate A2G are separated from the same column of the same strip A of the same panel 1. The third identification code 130 disposed on the substrate A1G may differ from the third identification code 130 disposed on the substrate A2G. This is because the substrate A1G is separated from the first row of the strip A and the substrate A2G is separated from the second row of the strip A.

When viewed in a plan view, the unit region 111R and the identification pad 111 may have various shapes and sizes. When viewed in a plan view, the unit region 111R and the identification pad 111 may have various shapes such as a circular shape, a square shape, a square shape with rounded corners, circular shapes having different sizes, square shapes having different sizes, or square shapes with rounded corners having different sizes.

In some example embodiments, when viewed in a plan view, the unit region 111R and the identification pad 111 may have a circular shape. A first diameter D1 of the unit region 111R or the identification pad 111 may be, for example, 50 μm or less. The unit region 111R or the identification pad 111 may have the same or substantially similar diameter. The identification pad 111 may be a dot pattern when viewed in a plan view.

FIGS. 9 to 13 are views illustrating a first identification code of FIG. 3, according to some example embodiments. For convenience of description, the following description will be based on differences from the description made with reference to FIGS. 1 to 8.

Figure 9:
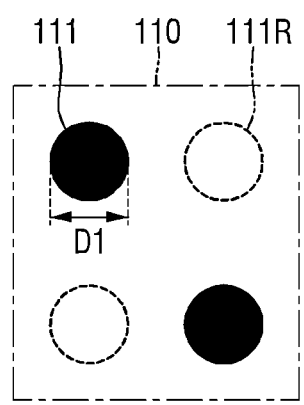
FIGS. 9 to 13 are views illustrating a first identification code of FIG. 3, according to some example embodiments.

Referring to FIG. 9, the first identification code 110 may include four unit regions 111R. The four unit regions 111R may be arranged in two rows and two columns, for example.

Figure 10:
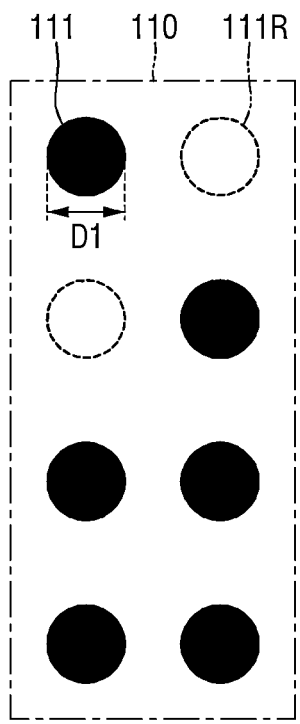

Referring to FIG. 10, the first identification code 110 may include eight unit regions 111R. The eight unit regions 111R may be arranged in four rows and two columns, for example.

Figure 11:
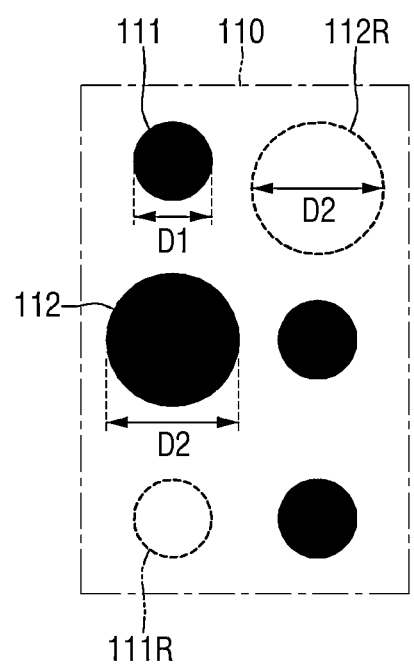

Referring to FIG. 11, the first identification code 110 may include unit regions 111R having different sizes. The first identification code 110 may include a unit region 111R having a first diameter D1 and a unit region 112R having a second diameter D2.

Therefore, the first identification code 110 may include identification pads 111 and 112 having different sizes. The first diameter D1 of the first identification pad 111 may be different from the diameter D2 of the second identification pad 112. The first diameter D1 of the first identification pad 111 may be smaller than the diameter D2 of the second identification pad 112. The diameter D2 of the second identification pad 112 may be, for example, 50 μm or less.

The number, arrangement, etc. of the first and second identification pads 111 and 112 included in the first identification code 110 are not limited to those shown, and may vary depending on designs.

Figure 12:
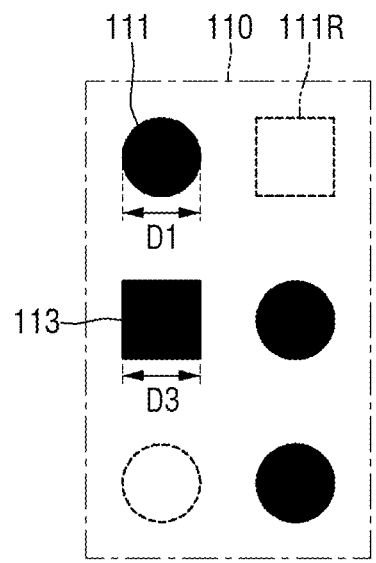

Referring to FIG. 12, the first identification code 110 may include unit regions 111R having different shapes when viewed in a plan view. For example, the unit region 111R may have a circular shape and a rectangular shape when viewed in a plan view.

Therefore, the first identification code 110 may include identification pads 111 and 113 having different shapes from each other when viewed in a plan view. When viewed in a plan view, the first identification pad 111 may have a circular shape, and the third identification pad 113 may have a square shape.

A width D3 of the third identification pad 113 in the first direction DR1 or the second direction DR2 may be, for example, 50 μm or less. The width D3 of the third identification pad 113 in the first direction DR1 or the second direction DR2 may be the same as or substantially similar to the first diameter D1 of the first identification pad 111, for example.

The number, arrangement, etc. of the first and third identification pads 111 and 113 included in the first identification code 110 are not limited to those shown, and may vary depending on designs.

Figure 13:
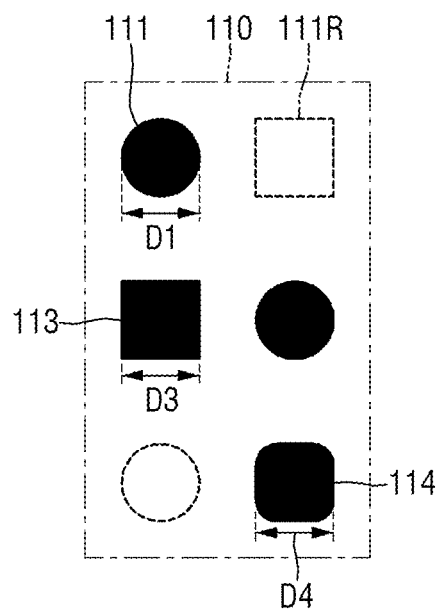

Referring to FIG. 13, the first identification code 110 may include unit regions 111R having different shapes from each other when viewed in a plan view. For example, the unit region 111R may have a circular shape, a square shape, and a square shape with rounded corners when viewed in a plan view.

Therefore, the first identification code 110 may include identification pads 111, 113 and 114 having different shapes when viewed in a plan view. When viewed in a plan view, the first identification pad 111 may have a circular shape, the third identification pad 113 may have a square shape, and the fourth identification pad 114 may have a square shape with rounded corners.

A width D4 of the fourth identification pad 114 in the first direction DR1 or the second direction DR2 may be, for example, 50 μm or less. The width D4 of the fourth identification pad 114 in the first direction DR1 or the second direction DR2 may be the same as or substantially similar to the first diameter D1 of the first identification pad 111.

The number, arrangement, etc. of the first, third and fourth identification pads 111, 113 and 114 included in the first identification code 110 are not limited to those shown, and may vary depending on designs.

Figure 14:
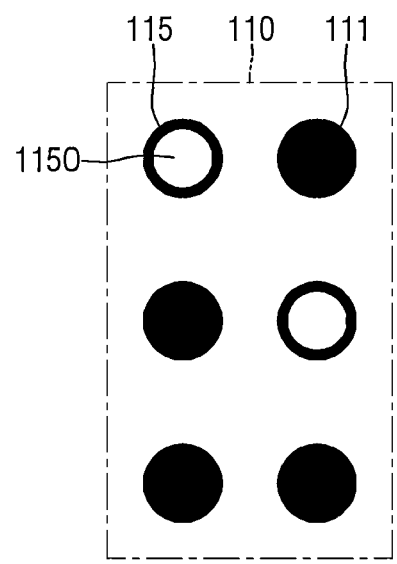
FIGS. 14 to 16 are views illustrating a first identification code of FIG. 3, according to some example embodiments.
Figure 15:
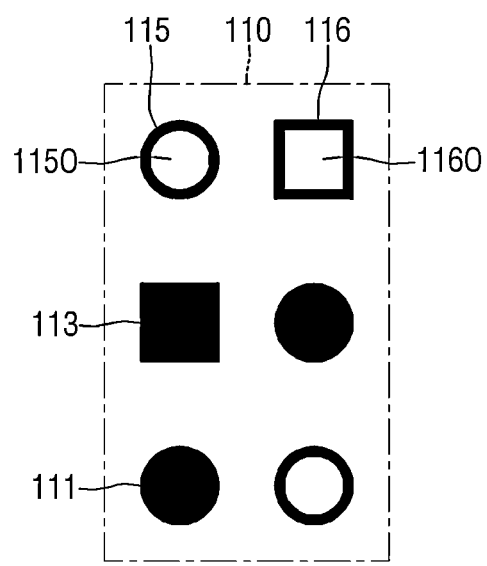
Figure 16:
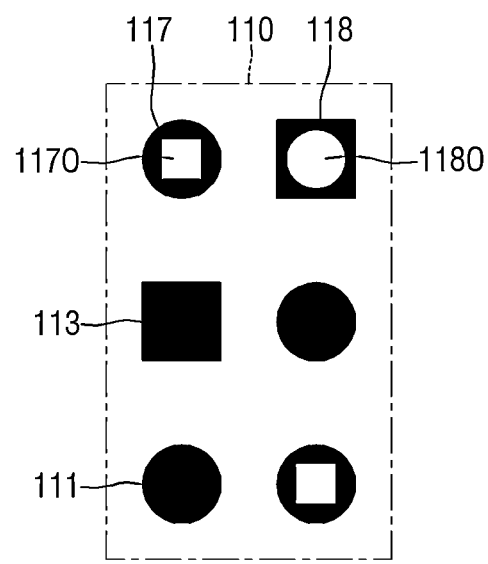

FIGS. 14 to 16 are views illustrating a first identification code of FIG. 3 according to some example embodiments. For convenience of description, the following description will be based on differences from the description made with reference to FIGS. 1 to 13.

Referring to FIG. 14, the first identification code 110 may include a plurality of identification pads 111 and 115. The first identification code 110 may include, for example, six identification pads 111 and 115. The identification pads 111 and 115 may be arranged in three rows and two columns, for example.

The first identification code 110 may represent from which panel the substrate 100 is separated by using whether an opening 1150 is formed in each of the identification pads 111's and 115's. The first identification code 110 may represent from which panel the substrate 100 is separated depending on whether the opening(s) 1150 is/are formed in any one or more of the identification pads having the same size and shape.

For example, the first identification code 110 may represent from which panel the substrate 100 is separated depending on whether the opening(s) 1150 is/are formed in any one or more of the identification pads having a circular shape when viewed in a plan view.

For example, the opening 1150 may be circular when viewed in a plan view.

The first identification code 110 may represent from which panel the substrate 100 is separated by using the first identification pad 111 in which the opening 1150 is not formed and the fifth identification pad 115 in which the opening 1150 is formed. When viewed in a plan view, the fifth identification pad 115 may have a ring shape.

Referring to FIG. 15, the first identification code 110 may include a plurality of identification pads 111, 113, 115 and 116. The first identification code 110 may include, for example, six identification pads 111, 113, 115 and 116. The identification pads 111, 113, 115 and 116 may be arranged in three rows and two columns, for example.

The first identification code 110 may represent from which panel the substrate 100 is separated depending on whether the opening 1150 and/or 1160 are formed in any one or more of the identification pads having different shapes when viewed in a plan view.

For example, the first identification code 110 may include identification pads 111, 113, 115 and 116 having different shapes when viewed in a plan view. When viewed in a plan view, the first identification code may include identification pads 111 and 115 having a circular shape and identification pads 113 and 116 having a square shape. The first identification code 110 may represent from which panel the substrate 100 is separated depending on whether the openings 1150 and 1160 are formed in any one or more of the identification pads 111 and 115 having a circular shape and the identification pads 113 and 116 having a square shape when viewed in a plan view.

The number, arrangement, etc. of the identification pads 111 and 115 having a circular shape and the identification pads 113 and 116 having a square shape when viewed in a plan view, both of which are included in the first identification code 110, are not limited to those shown, and may vary depending on designs.

For example, when viewed in a plan view, the opening 1150 formed in the identification pads 111 and 115 having a circular shape and the opening 1160 formed in the identification pads 113 and 116 having a square shape may have shapes different from each other.

The shape, size, etc. of the openings 1150 and 1160 are not limited to those shown, and may vary depending on designs. Regardless of the shape of the identification pads 111, 113, 115 and 116, the openings 1150 and 1160 formed in the identification pads 111, 113, 115 and 116 may have the same shape or size.

The first identification code 110 may represent from which panel the substrate 100 is separated by using the first identification pad 111 having a circular shape, the third identification pad 113 having a square shape, the fifth identification pad 115 having a circular shape and provided with an opening 1150 therein, and the sixth identification pad 116 having a square shape and provided with an opening 1160 therein, when viewed in a plan view.

Referring to FIG. 16, the first identification code 110 may include a plurality of identification pads 111, 113, 117 and 118. The first identification code 110 may include, for example, six identification pads 111, 113, 117 and 118. The identification pads 111, 113, 117 and 118 may be arranged in three rows and two columns, for example.

The first identification code 110 may represent from which panel the substrate 100 is separated depending on whether openings 1170 and 1180 are formed in any one or more of the identification pads having different shapes when viewed in a plan view.

For example, the first identification code 110 may include identification pads 111 and 117 having a circular shape and identification pads 113 and 118 having a square shape when viewed in a plan view. The first identification code 110 may represent from which panel the substrate 100 is separated depending on whether the one or more openings 1170 and 1180 are formed in any one or more of the identification pads 111 and 117 having a circular shape and the identification pads 113 and 118 having a square shape when viewed in a plan view.

The number, arrangement, etc. of the identification pads 111 and 117 having a circular shape and the identification pads 113 and 118 having a square shape when viewed in a plan view, both of which are included in the first identification code 110, are not limited to those shown, and may vary depending on designs.

When viewed in a plan view, the opening 1170 formed in the identification pads 111 and 117 having a circular shape may have a square shape, and the opening 1180 formed in the identification pads 113 and 118 having a square shape may have a circular shape.

When viewed in a plan view, the first identification code 110 may represent from which panel the substrate 100 is separated by using the first identification pad 111 having a circular shape, the third identification pad 113 having a square shape, the seventh identification pad 117 having a circular shape and provided with the opening 1170 therein, and the eighth identification pad 118 having a square shape and provided with the opening 1180 therein.

Figure 17:
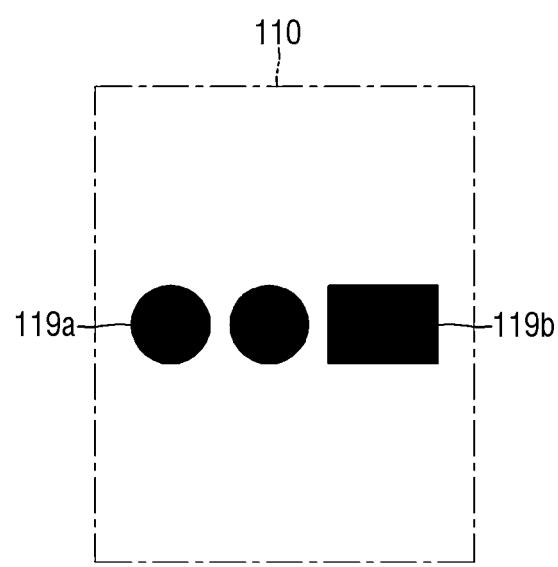
FIG. 17 is a view illustrating a first identification code of FIG. 3, according to an example embodiment.

FIG. 17 is a view illustrating a first identification code of FIG. 3, according to an example embodiment. For convenience of description, the following description will be based on differences from the description made with reference to FIGS. 1 to 16.

Referring to FIG. 17, the first identification code 110 may be represented by a Morse code. The first identification code 110 may be represented using an identification pad 119a having a circular shape and an identification pad 119b having a bar shape when viewed in a plan view.

Figure 18:
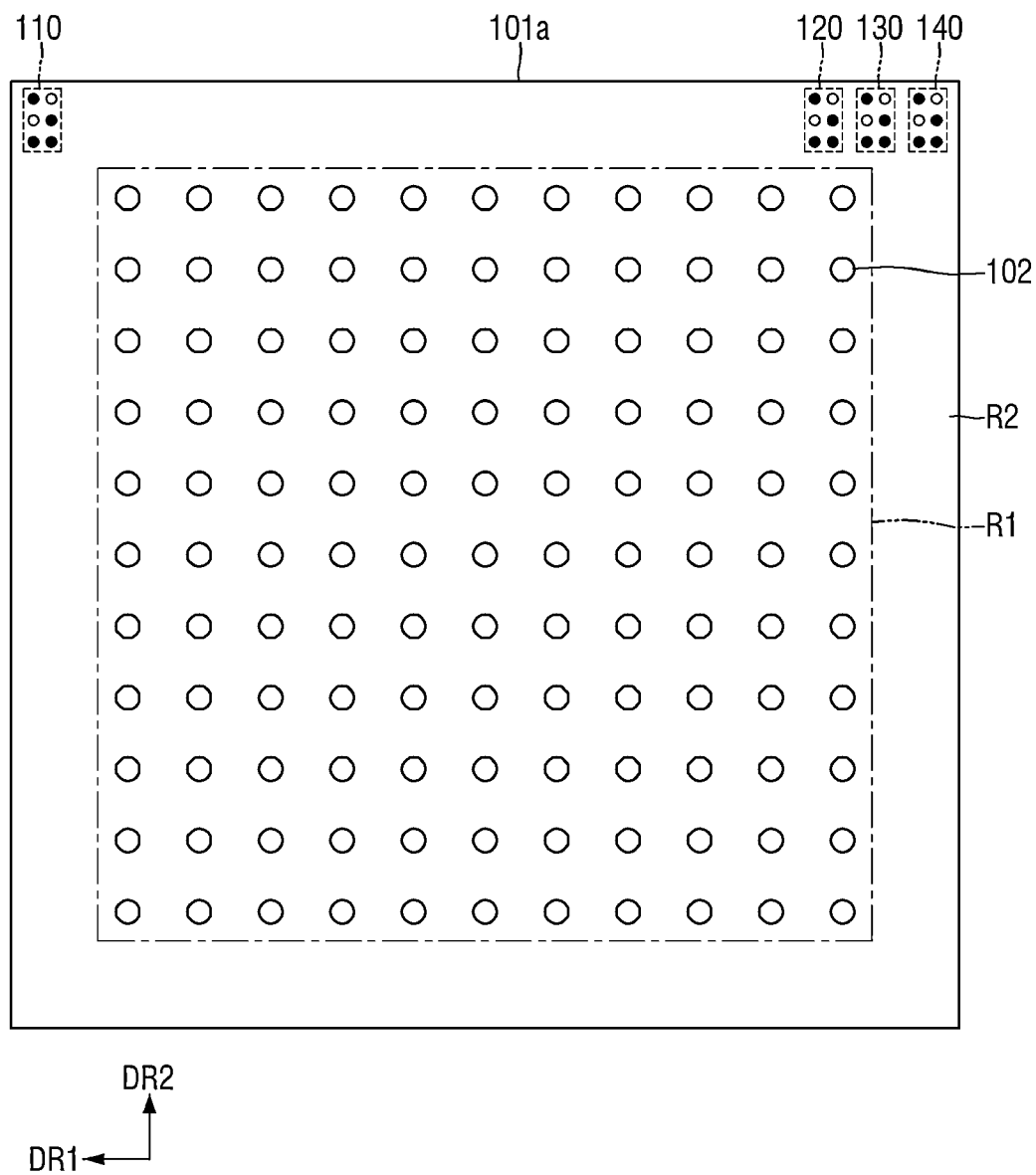
FIGS. 18 to 20 are views illustrating a substrate according to some example embodiments.
Figure 19:
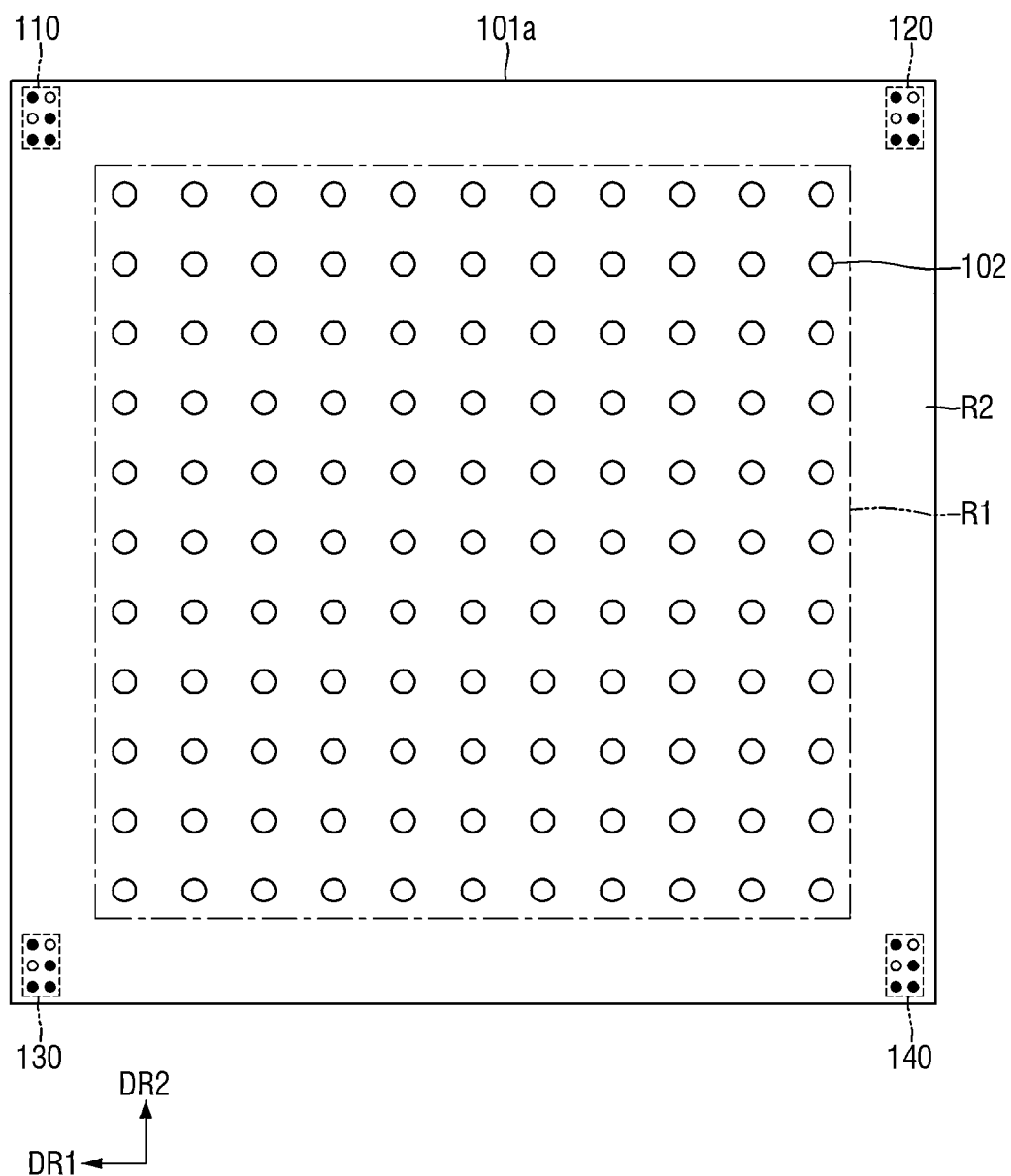
Figure 20:
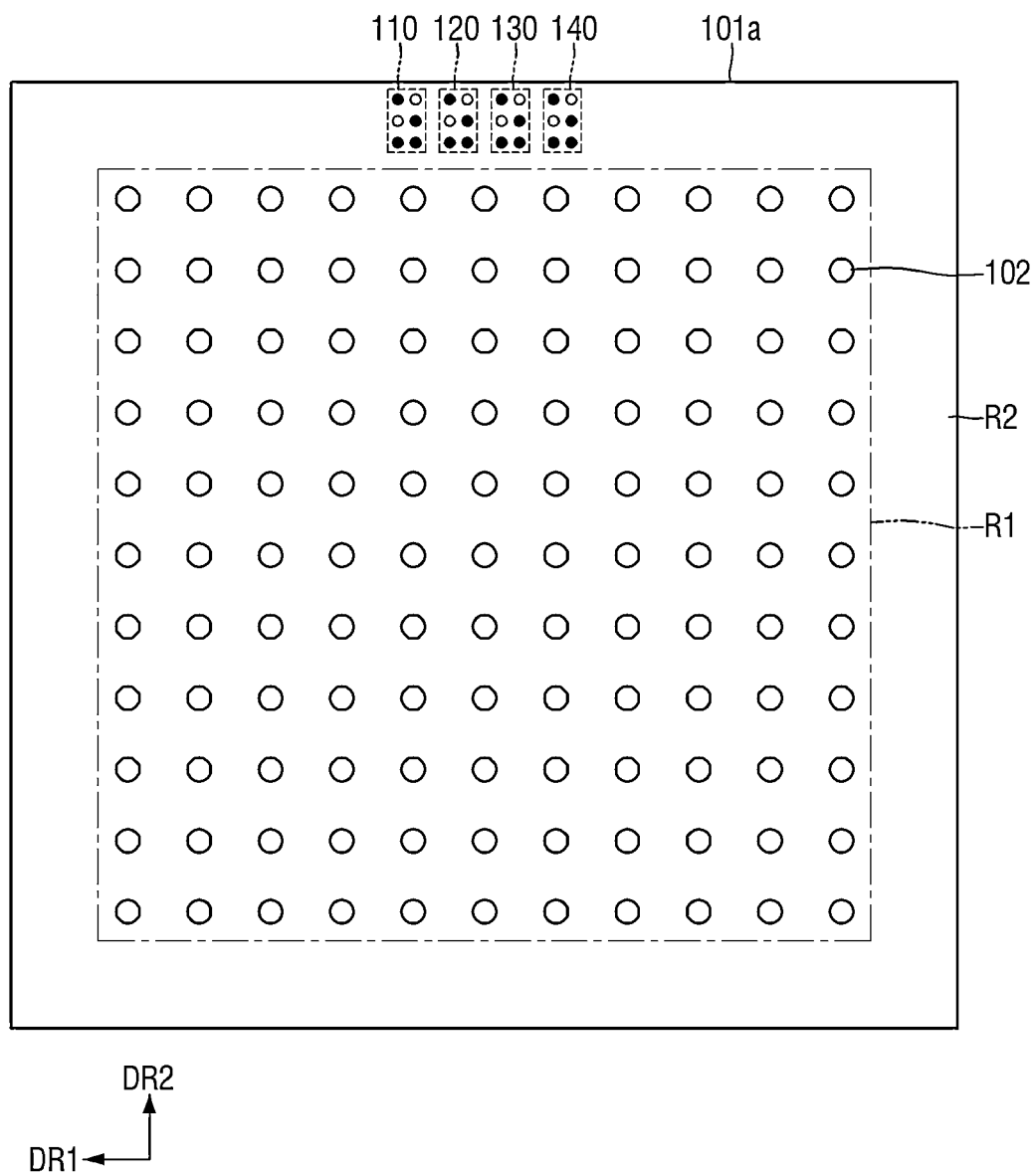

FIGS. 18 to 20 are views illustrating a substrate according to some example embodiments. For convenience of description, the following description will be based on differences from the description made with reference to FIGS. 1 to 17.

Referring to FIG. 18, some of the identification codes 110, 120, 130 and 140 may be adjacent to each other.

For example, the second to fourth identification codes 120, 130 and 140 may be adjacent to one another, but the first identification code 110 may be disposed to be spaced apart from the second to fourth identification codes 120, 130 and 140. The first surface 101a may include first and second sides extended in the first direction DR1, third and fourth sides extended in the second direction DR2, a first vertex where the first side and the third side meet, a second vertex where the first side and the fourth side meet, a third vertex where the second side and the third side meet, and a fourth vertex where the second side and the fourth side meet. For example, the first identification code 110 may be disposed to be adjacent to one of the four vertices of the first surface 101a, and the second to fourth identification codes 120, 130 and 140 may be disposed to be adjacent to the other one of the four vertices.

Referring to FIG. 19, the identification codes 110, 120, 130 and 140 may not be adjacent to one another.

For example, the first to fourth identification codes 110, 120, 130 and 140 may be disposed to be spaced apart from one another. For example, the first to fourth identification codes 110, 120, 130 and 140 may be disposed at four vertices of the first surface 101a, respectively.

Referring to FIG. 20, the identification codes 110, 120, 130 and 140 may be disposed to be adjacent to sides of the first surface 101a. For example, the identification codes 110, 120, 130 and 140 may be disposed to be adjacent to any one of the sides of the first surface 101a, which are extended in the first direction DR1 or the second direction DR2.

Figure 21:
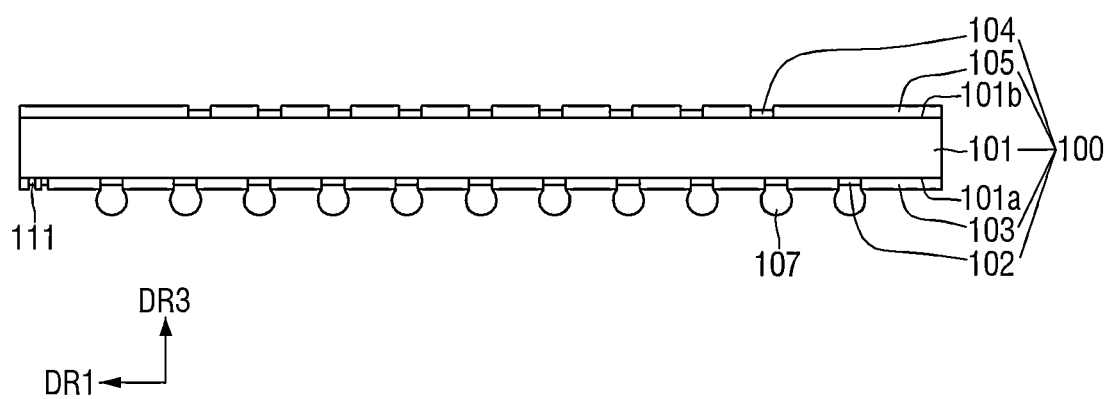
FIG. 21 is a view illustrating an identification code according to an example embodiment.

FIG. 21 is a view illustrating an identification code according to an example embodiment. For reference, FIG. 21 is a cross-sectional view taken along line I-I of FIG. 3. For convenience of description, the following description will be based on differences from the description made with reference to FIGS. 1 to 20.

Referring to FIG. 21, the first solder resist layer 103 may expose at least a portion of the identification pad 111. The first solder resist layer 103 may expose at least a portion of a lower surface of the identification pad 111.

Figure 22:
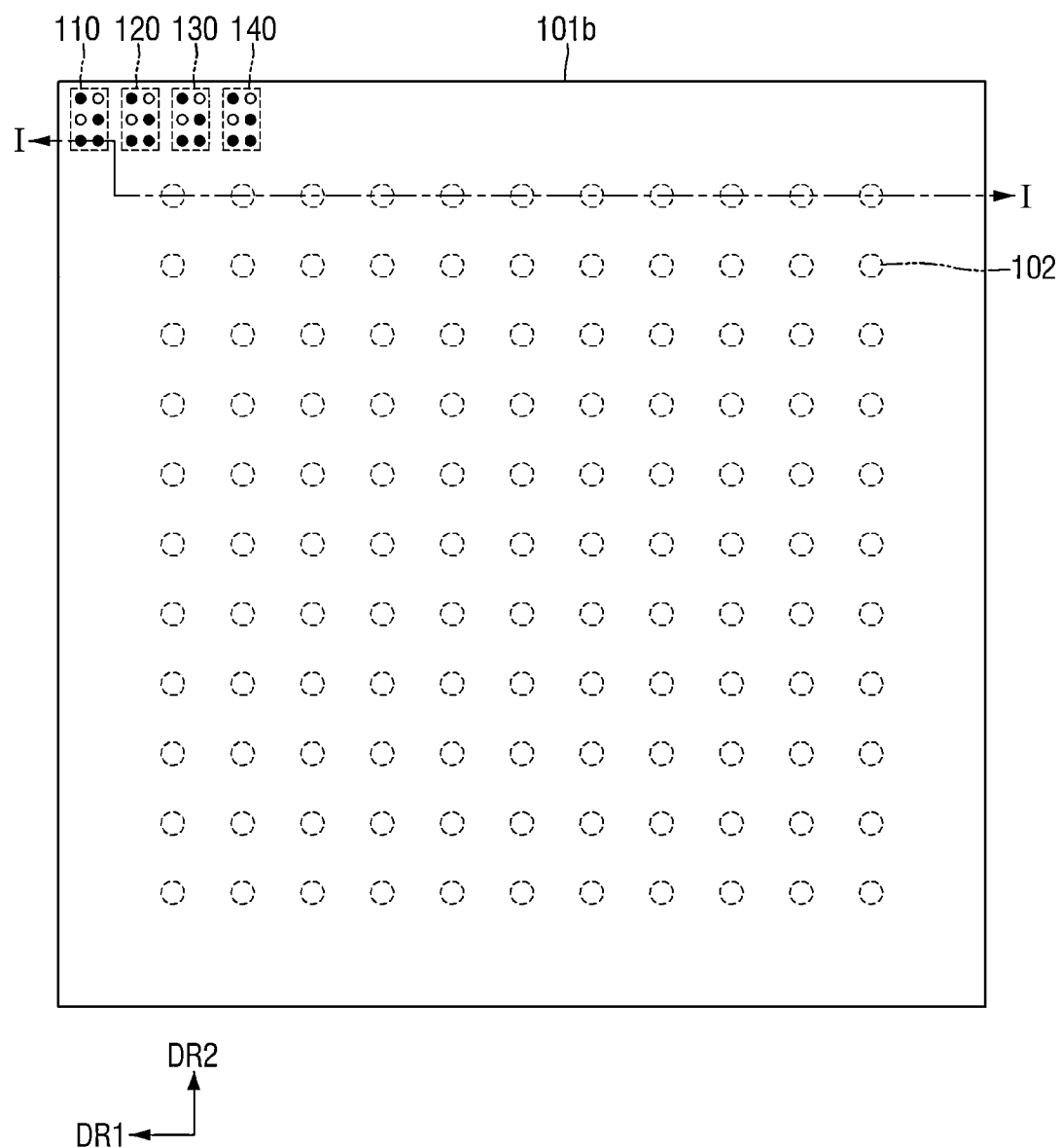
FIG. 22 is a view illustrating a substrate according to an example embodiment.
Figure 23:
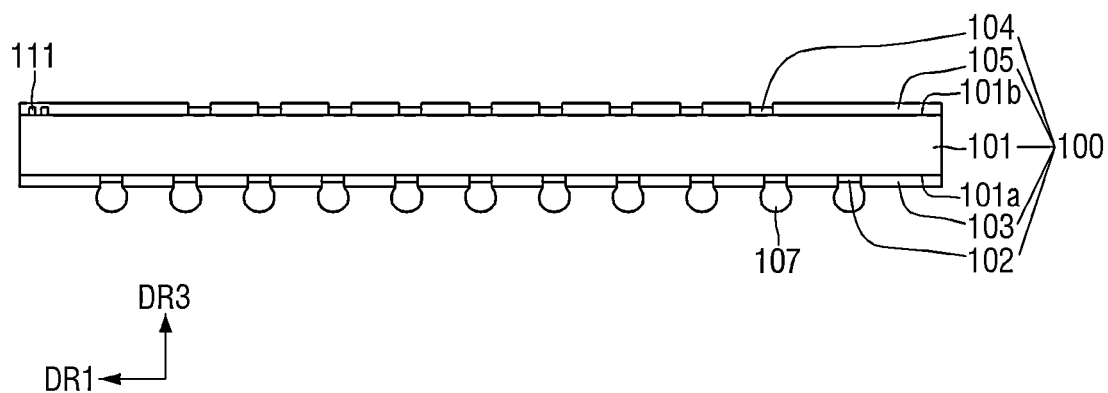
FIG. 23 is a cross-sectional view taken along line I-I of FIG. 22.

FIG. 22 is a view illustrating a substrate according to an example embodiment. FIG. 23 is a cross-sectional view taken along line I-I of FIG. 22. For convenience of description, the following description will be based on differences from the description made with reference to FIGS. 1 to 21.

Referring to FIGS. 22 and 23, the identification codes 110, 120, 130 and 140 may be disposed on the second surface 101b of the base substrate 101 in the substrate according to some example embodiments.

The second surface 101b of the base substrate 101 may include a second connection pad 104 and a plurality of circuit patterns connected to the second connection pad 104. A connection terminal connected to a semiconductor chip may be disposed on the second connection pad 104.

The second surface 101b of the base substrate 101 may include a circuit region, in which a second connection pad 104 and a plurality of circuit patterns connected to the second connection pad 104 are formed, and a dummy region in which the second connection pad 104 and the plurality of circuit patterns are not formed. The identification codes 110, 120, 130 and 140 may be disposed in the dummy region. Each of the first to fourth identification codes 110, 120, 130 and 140 may be disposed at various positions inside the dummy region.

In some example embodiments, the identification codes 110, 120, 130 and 140 may be disposed to be adjacent to a vertex where a side of the second surface 101a, which is extended in the first direction DR1, and a side of the second surface 101a, which is extended in the second direction DR2, meet.

The identification codes 110, 120, 130 and 140 may be disposed on the second surface 101b of the base substrate 101. The identification codes 110, 120, 130 and 140 each may include a plurality of identification pads 111. The identification pad 111 may be disposed on the second surface 101b of the base substrate 101.

In some example embodiments, the second solder resist layer 105 may cover the identification pad 111. The identification pad 111 may not be exposed by the second solder resist layer 105. Unlike the shown example, in some example embodiments, the second solder resist layer 105 may expose at least a portion of an upper surface of the identification pad 111.

Figure 24:
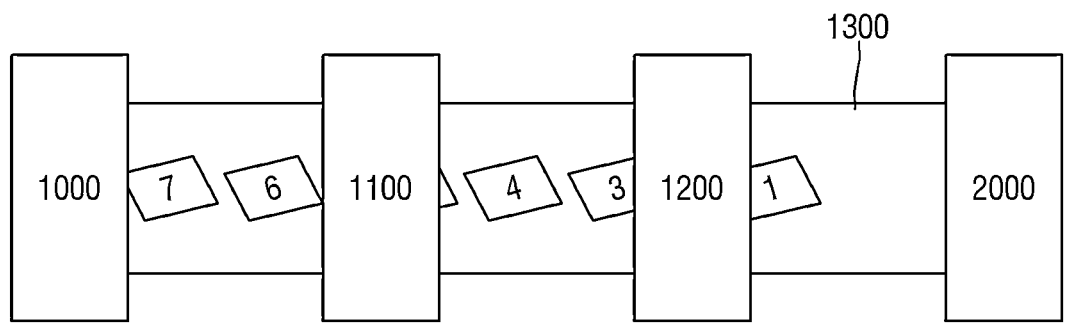
FIGS. 24 and 25 are views illustrating a substrate according to some example embodiments.
Figure 25:
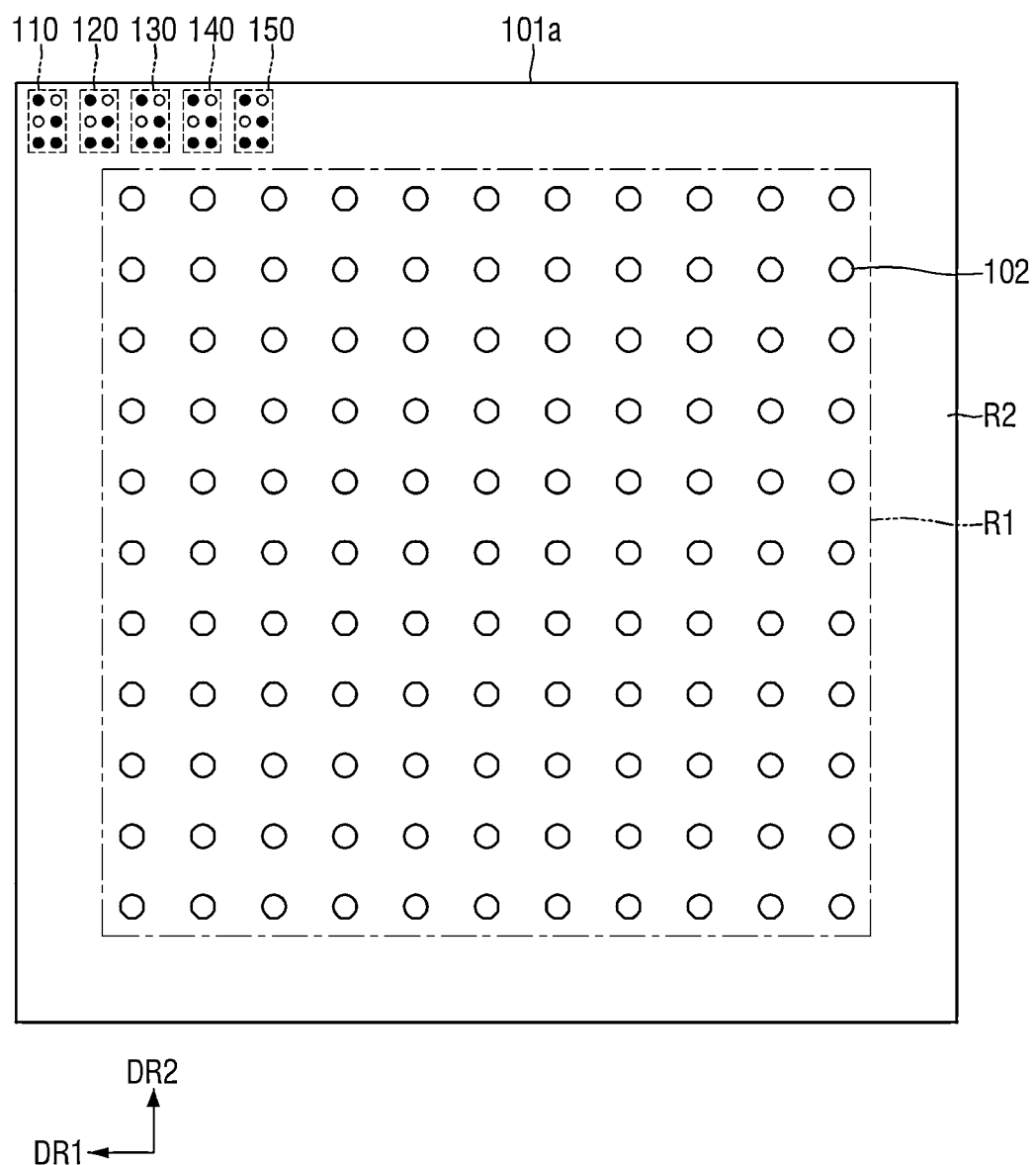

FIGS. 24 and 25 are views illustrating a substrate according to some example embodiments. For convenience of description, the following description will be based on differences from the description made with reference to FIGS. 1 to 23.

Referring to FIG. 24, a process may be performed for a plurality of panels 1 to 7 included in a lot. The plurality of panels 1 to 7 may be sequentially inserted into an inlet 1000 and loaded on a conveyor 1300. First chemical treatment 1100 and second chemical treatment 1200 may be sequentially performed for the plurality of panels 1 to 7. The panels 1 to 7 for which the processes are all performed may be unloaded from the conveyor 1300 in a receiver 2000.

Referring to FIG. 25, the substrate 100 according to an example embodiment may further include a fifth identification code 150.

In some example embodiments, the fifth identification code 150 may include information on a lot in which a panel from which the substrate 100 is separated is included. The fifth identification code 150 may include information on ID of a lot in which the panel 1 is included, or information on the corresponding lot.

When the substrate 100 is a substrate disposed in a row 'c' and a column 'd' in a (b)th strip, which includes a plurality of substrates formed by cutting a (b)th strip of an (a)th panel of a lot of which ID is 'e', the fifth identification code 150 may include information on 'e'. The fifth identification code 150 may represent 'e'.

Referring to FIGS. 24 and 25, in some example embodiments, the fifth identification code 150 may include information on a time or a timing point at which a process is performed for the panels 1 to 7.

For example, the fifth identification code 150 may include information on a first timing point at which the process is performed for the panels 1 to 7, or information on a second timing point at which the process is completed for the panels 1 to 7. For example, the fifth identification code 150 included in the panel 1 may include information on a timing point at which the panel 1 is inserted into the inlet 1000 or information on a timing point at which the panel 1 is received in the receiver 2000. In some example embodiments, the fifth identification code 150 included in the panel 1 may include information on a timing point at which the first chemical treatment 1100 or the second chemical treatment 1200 is performed for the panel 1.

In some example embodiments, when the substrate 100 is a substrate disposed in a row 'c' and a column 'd' in the (b)th strip, which includes a plurality of substrates formed by cutting the (b)th strip of the (a)th panel of the lot of which ID is 'e', the substrate 100 may further include at least one of an identification code including information on 'e', an identification code including information on a first timing point at which the process is performed for the (a)th panel, or an identification code including information on a second timing point at which the process is completed for the (a)th panel.

Figure 26:
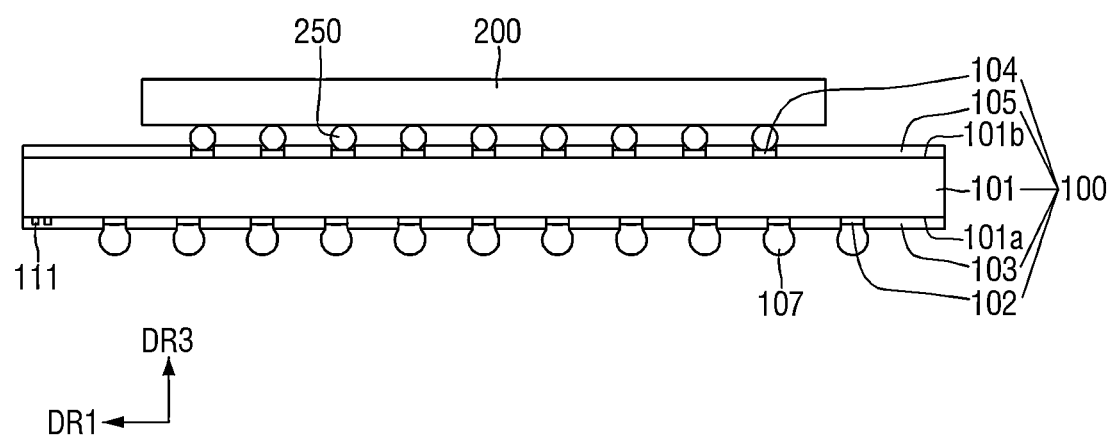
FIG. 26 is a view illustrating a semiconductor package according to an example embodiment.

FIG. 26 is a view illustrating a semiconductor package according to an example embodiment. For convenience of description, the following description will be based on differences from the description made with reference to FIGS. 1 to 25.

Referring to FIG. 26, the semiconductor package according to an example embodiment may include a substrate 100 and a semiconductor chip 200.

The semiconductor chip 200 may be packaged on the substrate 100. The semiconductor chip 200 may be disposed on the second surface 101b of the base substrate 101. A second connection terminal 250 may be disposed between the semiconductor chip 200 and the substrate 100. The second connection terminal 250 may be electrically connected to the semiconductor chip 200 and the second connection pad 104.

The substrate 100 may be any one of the substrates described with reference to FIGS. 1 to 25. The substrate 100 may include the identification codes described with reference to FIGS. 1 to 25.

Although some example embodiments of the present disclosure have been described with reference to the accompanying drawings, it will be apparent to those skilled in the art that the present disclosure can be manufactured in various forms without being limited to the above-described example embodiments and can be embodied in other specific forms without departing from technical spirits and essential characteristics of the present disclosure. Thus, the above example embodiments are to be considered in all respects as illustrative and not restrictive.

What is claimed is:

1. A substrate comprising:
   a base substrate including a first surface and a second surface opposite to the first surface;
   a connection pad on the first surface of the base substrate and electrically connected to a circuit pattern, the connection pad including a third surface opposite to the first surface and a fourth surface opposite to the third surface;
   first to fourth identification codes on the first surface of the base substrate, each of the first to fourth identification codes representing identification information based on at least one identification pad, the at least one identification pad including a fifth surface opposite to the first surface and a sixth surface opposite to the fifth surface; and
   a solder resist layer on the first surface of the base substrate, the solder resist layer covering a side wall of the connection pad and exposing the fourth surface of the connection pad, and covering a side wall of the at least one identification pad and the sixth surface of the at least one identification pad,
   wherein the substrate is one of a plurality of substrates at a row 'c' and a column 'd' in a (b)th strip of an (a)th panel, where the 'a', the 'b', the 'c' and the 'd' are natural numbers, the plurality of substrates being included in the (b)th strip of the (a)th panel,
   the first identification code includes information on the 'a',
   the second identification code includes information on the 'b',
   the third identification code includes information on the 'c', and
   the fourth identification code includes information on the 'd'.

2. The substrate of claim 1, wherein
   the substrate further comprising a connection terminal on the connection pad.

3. The substrate of claim 1, wherein each of the first to fourth identification codes includes a plurality of unit regions, and identification information of a corresponding one of the first to fourth identification codes is represented using an identification pad in each of the plurality of unit regions.

4. The substrate of claim 3, wherein when viewed in a plan view, the identification pad has a circular shape, a square shape or a square shape with rounded corners.

5. The substrate of claim 1, wherein the at least one identification pad includes a plurality of identification pads, and identification information of a corresponding one of the first to fourth identification codes is represented using an opening in one or more of the plurality of identification pads.

6. The substrate of claim 5, wherein when viewed in a plan view, wherein the opening has a circular shape or a square shape.

7. The substrate of claim 1, further comprising:
   a fifth identification code including information on ID of a lot in which the (a)th panel is included.

8. A substrate comprising:
   a base substrate including a first surface and a second surface opposite to the first surface;
   a connection pad on the first surface of the base substrate and electrically connected to a circuit pattern, the connection pad including a third surface opposite to the first surface and a fourth surface opposite to the third surface;
   a first identification code and a second identification code both on the first surface of the base substrate, each of the first and second identification codes representing identification information based on at least one identification pad, the at least one identification pad including a fifth surface opposite to the first surface and a sixth surface opposite to the fifth surface; and
   a solder resist layer on the first surface of the base substrate, the solder resist layer covering a side wall of the connection pad and exposing the fourth surface of the connection pad, and covering a side wall of the at least one identification pad and the sixth surface of the at least one identification pad,
   wherein the substrate is one of a plurality of substrates, the plurality of substrates being included in a strip of a panel,
   the first identification code includes information on a position of the strip on the panel, and
   the second identification code includes information on a position of the substrate on the strip.

9. The substrate of claim 8, further comprising:
   a third identification code on the first surface of the base substrate, the third identification code including information on the panel.

10. The substrate of claim 8, further comprising:
    at least one of a third identification code including information on a lot including the panel, a fourth identification code including information on a first time point at which a process is performed for the panel, or a fifth identification code including information on a second timing point at which the process for the panel is completed, on the first surface of the base substrate.

11. The substrate of claim 8, wherein the at least one identification pad has a circular shape in a plan view.

12. The substrate of claim 11, wherein the at least one identification pad includes first and second identification pads having a same diameter.

13. The substrate of claim 11, wherein the at least one identification pad includes first and second identification pads having diameters different from each other.

14. The substrate of claim 8, wherein
    the at least one identification pad includes first and second identification pads, and
    when viewed in a plan view, the first identification pad has a circular shape, and the second identification pad has a square shape.

15. The substrate of claim 8, wherein the at least one identification pad includes a first identification pad including an opening and a second identification pad not including the opening.

16. The substrate of claim 8, wherein
the first surface of the base substrate includes first to fourth vertices, and
each of the first and second identification codes is adjacent to a corresponding one of the first to fourth vertices.

17. The substrate of claim 8, wherein
the first surface of the base substrate includes first and second sides extended in a first direction and third and fourth sides extended in a second direction, and
each of the first and second identification codes is adjacent to a corresponding one of the first to fourth sides.

18. A substrate comprising:
a base substrate including a first surface and a second surface opposite to the first surface;
a connection pad on the first surface of the base substrate, the connection pad including a third surface opposite to the first surface and a fourth surface opposite to the third surface;
first to fourth identification codes on the first surface of the base substrate, each of the first to fourth identification codes representing identification information based on at least one identification pad, the at least one identification pad including a fifth surface opposite to the first surface and a sixth surface opposite to the fifth surface;
a solder resist layer on the first surface of the base substrate, the solder resist layer covering a side wall of the connection pad and exposing the fourth surface of the connection pad, and covering a side wall of the at least one identification pad and the sixth surface of the at least one of identification pad; and
a connection terminal on the fourth surface of the connection pad, the connection terminal being not on the sixth surface of the at least one identification pad,
wherein the substrate is one of a plurality of substrates at a row 'c' and a column 'd' in a (b)th strip of an (a)th panel, where the 'a', the 'b', the 'c' and the 'd' are natural numbers, the plurality of substrates being included in the (b)th strip of the (a)th panel,
the first identification code includes information on the 'a',
the second identification code includes information on the 'b',
the third identification code includes information on the 'c',
the fourth identification code includes information on the 'd', and
the at least one identification pad, which has a width smaller than that of the connection pad.

* * * * *